United States Patent [19]
Holmlund et al.

[11] 3,814,385
[45] June 4, 1974

[54] REGULATOR FOR PNEUMATIC VIBRATOR

[75] Inventors: Henrik Holmlund, Jarfalla; Erik Kåreby, Enskede, both of Sweden

[73] Assignee: Aktiebolaget Vibro-Verken, Solna, Sweden

[22] Filed: Jan. 11, 1973

[21] Appl. No.: 322,689

[30] Foreign Application Priority Data
Jan. 13, 1972 Sweden.............................. 345/72

[52] U.S. Cl. ........................ 259/1 R, 259/DIG. 43
[51] Int. Cl............................................ B01f 11/00
[58] Field of Search...... 259/1 R, DIG. 43, DIG. 42, 259/72

[56] References Cited
UNITED STATES PATENTS

| | | | |
|---|---|---|---|
| 3,460,808 | 8/1969 | Wilde................................ | 259/1 R |
| 3,727,890 | 4/1973 | Seidl............................ | 259/DIG. 43 |
| 3,746,310 | 7/1973 | Fransson...................... | 259/DIG. 43 |

Primary Examiner—Robert W. Jenkins
Attorney, Agent, or Firm—Brumbaugh, Graves, Donohue & Raymond

[57] ABSTRACT

A pneumatic vibrator of the type having a vibration-generating body that rolls within a casing and is powered by compressed air is provided with an automatic control valve that limits the vibration of the vibrator to a predetermined value, regardless of the load imposed upon the vibrator. A valve member interposed in the passage by which compressed air is delivered to the vibration-generating body is normally urged into an open position that provides normal operation of the vibrator. A regulating body rolls in a raceway, one surface of which is movable in association with the valve member. When the regulating body is subjected to acceleration beyond a given value, it shifts outwardly, relative to the axis of the raceway, thereby shifting the movable surface of the raceway and, in turn, the valve, to reduce the air flow.

8 Claims, 3 Drawing Figures

PATENTED JUN 4 1974 3,814,385

REGULATOR FOR PNEUMATIC VIBRATOR

BACKGROUND OF THE INVENTION

This invention relates to pneumatic vibrators of the type having a vibration-generating body that is arranged to roll within a casing and is powered by compressed air, such vibrators being used, for example, to vibrate newly placed wet concrete.

When vibrators of the type to which the invention relates run under reduced load, such as when run partially or entirely in air, the speed of vibration, as a result of an increase in the speed of rotation of the vibration-generating rolling body, tends to increase with the result of higher stresses and increased wear on the vibrator. Moreover, the increased rate of vibration tends to generate undesirable noise. Consequently, such vibrators are frequently provided with regulators that limit the vibration frequency. Previously known regulators for pneumatic vibrators employ the vibration-generating rolling body itself to provide the regulation function, so that should the frequency of vibration of the vibrator exceed a certain level, the rolling body acts on a valve which restricts the supply of air to the vibrator.

One disadvantage of previously proposed regulators that employ the rolling body itself to actuate a valve is a less efficient utilization of the compressed air. With vibrators of larger sizes, even more serious problems may arise if the vibration-generating rolling body itself is used as a regulator.

SUMMARY OF THE INVENTION

There is provided, in accordance with the invention, a regulator for a pneumatic vibrator of the above-described type and, in particular, a pneumatic vibrator of the type having a vibration-generating body arranged to roll within a casing about an axis and a passage system in the casing for communicating a gas under above-atmospheric pressure to produce rolling of the vibration-generating body.

The regulator comprises an adjustable valve interposed in the passage system, the valve including a valve member that is shiftable between a first position for communication of the gas under pressure in an amount not less than that required for a predetermined vibration of the vibrator under a given design load and a second position restricting gas flow through the passage to an amount limiting vibration to said predetermined vibration under loads less than said given design load. The regulator further includes a second, separate rolling body within the casing, which is hereinafter referred to as a "regulating body," that rolls within a tapered raceway. One surface defining the raceway for the regulating body is a surface on a member that is movable to shift the valve member in a direction from said first position towards said second position.

The valve is normally urged toward the first position for normal operation of the vibrator under load. The regulating body has a mass such that upon acceleration thereof due to vibration of the vibrator in excess of a predetermined vibration, the regulating body shifts position in the raceway and in so shifting moves the actuating member in a direction to shift the valve member from said first position toward said second position.

In one exemplary embodiment of the regulator the regulating body is a ball or roller that rolls within a raceway defined by surfaces that converge outwardly away from the axis of the raceway. One of the surfaces is on a member that is movable with the valve and may, in fact, be a surface formed on the valve member. The other surface is a surface associated with the casing of the vibrator. In another embodiment the valve member of the regulator is mounted on the vibration-generating rolling body and is in the form of a sleeve that is sealed to and surrounds the vibration-generating rolling body. A surface on the valve member defines a throttling orifice with a wall or abutment associated with the casing, and the raceway for the regulating body is formed by surfaces that diverge outwardly, relative to the axis of the raceway, one of the surfaces being formed on the vibration-generating body and the other being on a member that is shiftable with the valve. In the latter embodiment, the regulating body is an annular member that surrounds the vibration-generating body and the raceway.

Among the advantages of a regulator, made in accordance with the present invention, is the capability of being employed in a variety of designs of pneumatic vibrators of the type employing a vibration-generating rolling body. For example, the device can be used on vibrators which employ static pressure of compressed air, which is the mode of operation usually used in vibrators of large size.

For a better understanding of the invention, reference may be made to the following description of exemplary embodiments taken in conjunction with the figures of the accompanying drawings.

DESCRIPTION OF EXEMPLARY EMBODIMENTS

Figure 1:
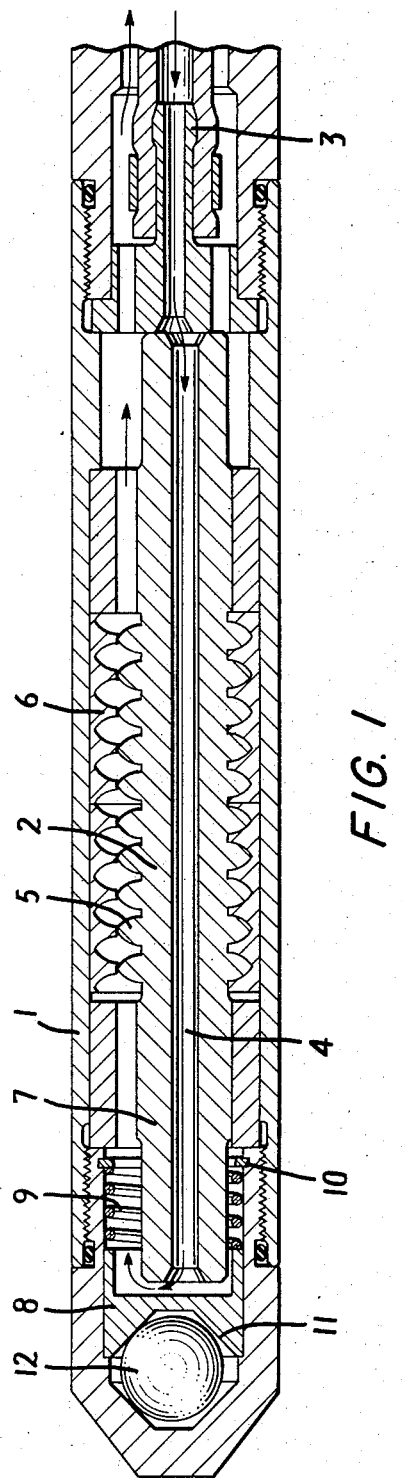
FIG. 1 is a longitudinal cross section of a pneumatic vibrator employing one form of regulator, the view being generally schematic.

A regulator, in accordance with the present invention and as illustrated in the figures of the drawing, is employed in a pneumatic vibrator which is composed of a casing 1 and a vibration-generating rolling body 2 that rolls within the casing under the influence of a static pressure in the form of compressed air conducted into the vibrator through an intake 3 and through a passage 4 formed in the rolling body 2. The air conducted through the passage 4 leaves the passage through the end of the rolling body and then flows to threaded, interacting portions 5 and 6 on the body and casing, respectively. The vibrator, per se, is of a known construction, and further description and illustration of the details of its construction and mode of operation are unnecessary. As is well known to those skilled in the art, the static pressure of compressed air delivered to the vibrator produces a rolling motion of the rolling body inside the casing on an eccentric or orbital path, relative to the axis of the body. The rate of rotation of the body, and thus the vibration frequency, are variables that depend upon the load imposed on the vibrator and the rate of air supply.

Figure 2:
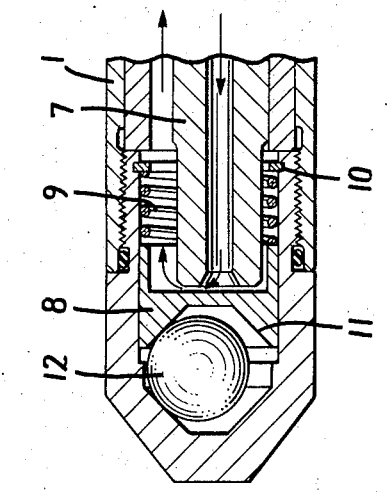
FIG. 2 is a view of the regulator portion of the vibrator of FIG. 1 and illustrating the regulator in a position in which it limits the gas flow.

In the embodiment illustrated in FIGS. 1 and 2 of the drawing, a regulator, in accordance with the invention, comprises a variable valve located at the end of the vibrator, remote from the air inlet, and associated with the opening at the end of the passage 4 adjacent the end portion 7 of the vibration-generating rolling body 2. The variable valve includes a valve member 8 that is received within the casing 1 in axial sliding relation and is composed of a body portion and a sleeve or flange. A portion of the sleeve or flange part of the valve member 8 overlaps part of the end portion 7 of the vibration-generating rolling body 2.

The surface of the valve member adjacent the end surface of the end portion 7 of the body 2 defines with such end portion a flow control orifice of variable dimension for regulating the flow rate of air through the passage 4. The external surface of the valve member 9 forms a sliding seal with the casing 1, and a spring 9 is compressed between a shoulder or snap ring 10 on the casing 1, and the valve member, thereby to urge the valve member to a normally open position providing for the flow of air to the vibrator in an amount at least adequate to provide normal vibration of the vibrator under load. The surface of the body portion of the valve member 8 opposite from the surface that faces the body 2 has a tapered surface that provides a portion of a raceway, and the companion surface of the raceway is formed in the end portion of the casing.

A regulating body 12 in the form of a spherical ball is received in the raceway defined by the respective tapered surfaces on the end portion of the casing and the valve member, such surfaces converging outwardly, relative to the axis of the raceway. The axis of the raceway is aligned with the axis of the casing, but the raceway is formed with a geometry, relative to the diameter of the ball 12 such that the ball rolls eccentrically about the axis of the raceway.

The vibrating motion of the vibrator during operation causes the ball 12 to roll about the axis of the raceway. If the vibration motion is of a frequency such that a predetermined value of centrifugal acceleration of the ball is attained, the ball pushes outwardly against the race with a force sufficient to displace the valve member 8 against the force of the spring 9 and thereby decrease the dimension of the flow control space defined between the valve member and the end of the vibration-generating rolling body 2. This, in turn, reduces the flow of air to the vibrator and, therefore, the vibration frequency. FIG. 2 of the drawings illustrates the outwardly shifted position of the orbital path of the ball about the axis of the raceway such that the valve member is shifted axially to reduce the dimension of the flow control orifice. Thus, it should be evident from the foregoing that the valve and the associated regulating body that operates the valve limit the vibration frequency to a predetermined value, as established by the orbit of the ball, and the acceleration forces exerted on it by vibration of the vibrator.

Figure 3:
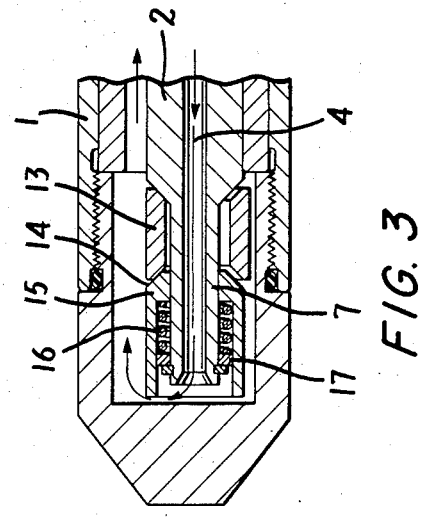
FIG. 3 is a longitudinal cross-sectional view of another form of regulator employed in a vibrator of the type illustrated in FIG. 1.

The embodiment illustrated in FIG. 3 of the drawings is employed in a vibrator that is substantially identical in basic construction to that illustrated in FIG. 1. In the embodiment of FIG. 3, however, the regulating body and the valve are received on the end portion 7 of the vibration-generating roll and body 2. More particularly, the regulating rolling body is an annular ring 13 which rolls around a tapered raceway 14 defined by respective inwardly converging surfaces formed on the end portion 7 of rolling body 2 and an end portion of a valve member 15. The valve member 15 includes a sleeve that is slidable in sealing relation on the end portion of the vibration-generating rolling body 2 and is urged by a spring 16 received within the sleeve and compressed between a shoulder on the valve member and a snap ring or abutment 17 on the end portion of the rolling body.

The end of the sleeve that faces the end wall of the casing 1 defines with such end wall a flow control orifice of a dimension appropriate to provide an adequate air supply for normal operation of the vibrator. Upon attaining a predetermined value of centrifugal acceleration, the orbital path along which the regulating rolling body rolls, relative to the axis of the vibration-generating rolling body (which is coincident with the axis of the raceway) shifts outwardly, thereby shifting the valve member 15 in a direction against the force of the spring 16, thereby to reduce the dimension of the flow control orifice and, in turn, reduce the flow rate of air to the vibrator. Accordingly, the frequency of vibration of a vibrator is reduced below the level it would otherwise have attained in the absence of the flow control provided by the regulator.

It will be evident to those skilled in the art that the regulator may be designed so that it will not affect the rate of air flow until a certain vibration frequency and a commensurate acceleration of the regulating rolling body has been attained, thus limiting vibration frequency when the vibrator is idling, such as when it is partially or totally removed from a load. Since the maximum vibration frequency is limited, thereby commensurately limiting the maximum loads imposed on the vibrator, there is a reduction in wear, and the design capability of providing a less strong construction than otherwise would be required. Moreover, the idling mode of operation of a vibrator employing a regulator made according to the invention provides a reduction in the comsumption of air.

The above-described embodiments in the invention are intended to be exemplary, and many variations and modifications of the embodiments may be made by those skilled in the art without departing from the spirit and scope of the invention. For example, a regulator embodying the present invention may be employed in various types of pneumatic vibrators, notwithstanding its particularly advantageous utilization in vibrators of the type powered by the static pressure of compressed air. All such variatons and modifications are to be included within the scope of the invention, as defined in the appended claims.

We claim:

1. In a pneumatic vibrator of the type having a vibration-generating body arranged to roll within a casing about an axis, and passage means in the casing for communicating a gas under above-atmospheric pressure to produce rolling of the vibration-generating body, the improvement of a regulator comprising adjustable valve means interposed in the passage means and including a valve member shiftable between a first position for communication of the gas under pressure in an amount not less than that required for a predetermined vibration of the vibrator under a given load and a second position restricting gas flow through the passage means to an amount limiting vibration to said predetermined vibration of the vibrator under loads less than said given load, means defining a tapered raceway having an axis generally coincident with the axis about which the vibration-generating body rolls, said tapered raceway including a surface on a member that is movable to shift the valve member in a direction from said first position toward said second position thereof, means normally urging said valve in a direction from said second position toward said first position thereof, and a regulating body received in the raceway for rolling therein about the axis of the raceway, the regulating body having a mass such that upon acceleration thereof due to vibration of the vibrator in excess of said predetermined vibration the regulating body moves outwardly in the raceway and in so moving moves the movable member in a direction to shift the valve member from said first position toward said second position.

2. An improvement according to claim 1 wherein the raceway is formed by surfaces that converge outwardly, relative to the axis of the raceway, and the regulating body is a member having generally spherical surfaces rolling on the raceway.

3. An improvement according to claim 1 wherein the raceway is formed by surfaces that diverge outwardly, relative to the axis of the raceway, and wherein the regulating body is an annular member.

4. An improvement according to claim 1 wherein the said surface of the raceway on a member movable with the valve member is a surface on the valve member.

5. An improvement according to claim 1, the vibrator being of a type in which the passage means includes a hole extending through the vibration-generating body generally parallel to the axis thereof and having an outlet at one end of the vibration-generating body, wherein the valve member is shiftable toward and away from the outlet of the hole and has a valve surface that defines a variable gas flow-throttling orifice with a portion of the vibration-generating body adjacent the outlet.

6. An improvement according to claim 5 wherein the said surface of the raceway on a member movable with the valve member is a surface on the valve member, the other surface of the raceway is associated with the body, the raceway is defined by surfaces that converge outwardly, relative to the axis of the raceway, and the regulating body is a member having generally spherical surfaces rolling on the raceway surfaces.

7. An improvement according to claim 1, the vibrator being of a type in which the passage means includes a hole extending through the vibration-generating body generally parallel to the axis thereof and having an outlet at one end of the vibration-generating body, said one end facing a wall of the body and being in spaced relation thereto, wherein the valve member is slidably mounted on the vibration-generating body in sealed relation thereto and has a valve surface that defines a variable gas flow-throttling orifice with said wall of the body.

8. An improvement according to claim 7 wherein the said surface of the raceway on a member movable with the valve member is a surface on the valve member, the other of the raceway is associated with the vibration-generating body, the surfaces of the raceway diverge outwardly relative to the axis of the raceway, and the regulating body is an annular member.

* * * * *

O-1050
(5/69)

UNITED STATES PATENT OFFICE
CERTIFICATE OF CORRECTION

Patent No. 3,814,385  Dated June 4, 1974

Inventor(s) Henrik Holmlund and Erik Kareby

It is certified that error appears in the above-identified patent and that said Letters Patent are hereby corrected as shown below:

Cover page, Item [73], "Aktiebolaget Vibro-Verken" should be --Dynapac Maskin Aktiebolag--; Column 4, line 39, "comsumption" should be --consumption--; Column 6, line 28, after "other" insert --surface--.

Signed and sealed this 29th day of October 1974.

(SEAL)
Attest:

McCOY M. GIBSON JR.
Attesting Officer

C. MARSHALL DANN
Commissioner of Patents